(12) United States Patent
Luhta et al.

(10) Patent No.: US 8,525,119 B2
(45) Date of Patent: Sep. 3, 2013

(54) DETECTOR ARRAY WITH PRE-FOCUSED ANTI-SCATTER GRID

(75) Inventors: Randall P. Luhta, Highland Heights, OH (US); Rodney A. Mattson, Mentor, OH (US); Brian E. Harwood, Rocky River, OH (US)

(73) Assignee: Koninklijke Philips N. V., Eindhoven (NL)

( * ) Notice: Subject to any disclaimer, the term of this patent is extended or adjusted under 35 U.S.C. 154(b) by 11 days.

(21) Appl. No.: 13/319,100

(22) PCT Filed: Apr. 14, 2010

(86) PCT No.: PCT/IB2010/051630
§ 371 (c)(1),
(2), (4) Date: Nov. 7, 2011

(87) PCT Pub. No.: WO2010/133984
PCT Pub. Date: Nov. 25, 2010

(65) Prior Publication Data
US 2012/0049074 A1    Mar. 1, 2012

Related U.S. Application Data

(60) Provisional application No. 61/179,817, filed on May 20, 2009.

(51) Int. Cl.
*G01T 1/20* (2006.01)
(52) U.S. Cl.
USPC .......................................... 250/366

(58) Field of Classification Search
USPC ............... 250/366, 367, 394, 370.09, 370.14, 250/370.11
See application file for complete search history.

(56) References Cited

U.S. PATENT DOCUMENTS

| | | | |
|---|---|---|---|
| 5,487,098 A | 1/1996 | Dobbs et al. | |
| 6,778,637 B2 | 8/2004 | Luhta et al. | |
| 7,196,331 B2 | 3/2007 | Heismann | |
| 8,132,802 B2 * | 3/2012 | Kolodge et al. | 269/275 |
| 2003/0127609 A1 * | 7/2003 | El-Hage et al. | 250/574 |
| 2004/0238750 A1 * | 12/2004 | Vafi et al. | 250/370.11 |
| 2006/0076498 A1 | 4/2006 | Hilderscheid et al. | |
| 2006/0124856 A1 | 6/2006 | Heismann | |
| 2006/0185165 A1 * | 8/2006 | Vafi et al. | 29/854 |
| 2006/0231767 A1 | 10/2006 | Danzer et al. | |
| 2007/0007462 A1 * | 1/2007 | Stevens et al. | 250/370.14 |

* cited by examiner

*Primary Examiner* — David Porta
*Assistant Examiner* — Faye Boosalis

(57) ABSTRACT

A radiation sensitive detector array includes a plurality of detector modules (118) extending along a z-axis direction and aligned along an x-axis direction with respect to the imaging system (100). At least one of the detector modules (118) includes a module backbone (124) and at least one detector tile (122). The at least one detector tile (122) is coupled to the module backbone (124) through a non-threaded fastener (142). The at least one detector tile (122) includes a two-dimensional detector (126) and a two-dimensional anti-scatter grid (128) that is focused at a focal spot (112) of an imaging system (100).

19 Claims, 7 Drawing Sheets

DETECTOR ARRAY WITH PRE-FOCUSED ANTI-SCATTER GRID

CROSS REFERENCE TO RELATED APPLICATIONS

This application claims the benefit of U.S. provisional application ser. no. 61/179,817 filed May 20, 2009, which is incorporated herein by reference.

The following generally relates to a detector array with an anti scatter grid, and finds particular application to computed tomography (CT). However, it also amenable to other medical imaging applications and to non-medical imaging applications.

Generally, a computed tomography (CT) scanner includes an x-ray tube and a detector array. The x-ray tube emits radiation from a focal spot, and the emitted radiation traverses an examination region. The detector array is disposed across from the x-ray tube on an opposite side of the examination region and detects radiation traversing the examination region. The detector array converts detected radiation into a signal indicative of the detected radiation. A reconstructor reconstructs the signal to generate volumetric image data thereof. An image generator generates one or more images of a scanned subject or object based on the volumetric image data.

With one CT system, the detector array includes a plurality of detector modules, each having a plurality of photosensor blocks. Each photosensor block is a stacked structure consisting of an anti-scatter grid (ASG), a scintillator array, a photosensor array, processing electronics, and a base. The photosensor blocks are first assembled and then used to populate detector modules. The base of each photosensor block includes a threaded recess, and each photosensor block is installed in a detector module by aligning the threaded recess of a photosensor block with a hole machined in the module backbone, inserting a screw through the hole to the recess, and engaging the screw with the threaded recess.

Unfortunately, the alignment of the ASG of a photosensor block with the focal spot depends on the accuracy of the machining of the hole in the module backbone and the accuracy of the assembly of each stacked photosensor block as the stacking of the individual components of each photosensor block may introduce, propagate and/or magnify a stacking error. The foregoing may lead to non-negligible errors in the alignment of an ASG in the detector module and hence with the focal spot, and poor alignment of an ASG with the focal spot can cause detector shadowing, which in turn can cause artifacts such as rings in the CT image.

Aspects of the present application address the above-referenced matters and others.

According to one aspect, a radiation sensitive detector array includes a plurality of detector modules extending along a z-axis direction and aligned along an x-axis direction with respect to the imaging system. At least one of the detector modules includes a module backbone and at least one detector tile. The at least one detector tile is coupled to the module backbone through a non-threaded fastener. The at least one detector tile includes a two-dimensional detector and a two-dimensional anti-scatter grid that is focused at a focal spot of an imaging system.

According to another aspect, a detector array of an imaging system with a focal spot includes a plurality of detector modules aligned along a transverse direction with respect to the imaging system. At least one of the detector modules includes a detector tile. The detector tile includes a two-dimensional anti-scatter grid that is focused with respect to the focal spot of the imaging system before installing the at least one detector module in the imaging system.

According to another aspect, a method aligns an anti-scatter grid of a detector tile with a focal spot of an imaging system prior to installing the anti-scatter grid in the imaging system. The method includes inserting at least one two-dimensional anti-scatter grid in a guide region of an alignment apparatus. The guide region including one or more fiducials that guide the at least one two-dimensional anti-scatter grid in the guide region. The guide region being pre-aligned with the focal spot, and guiding the at least one two-dimensional anti-scatter grid into the guide region focuses the at least one two-dimensional anti-scatter grid with the focal spot.

According to another aspect, an alignment apparatus for focusing anti-scatter grids with a focal spot of an imaging system outside of the imaging system. The alignment apparatus includes at least one guide region configured to receive an anti-scatter grid and focus the anti-scatter grid with respect to the focal spot.

The invention may take form in various components and arrangements of components, and in various steps and arrangements of steps. The drawings are only for purposes of illustrating the preferred embodiments and are not to be construed as limiting the invention.

Figure 4:
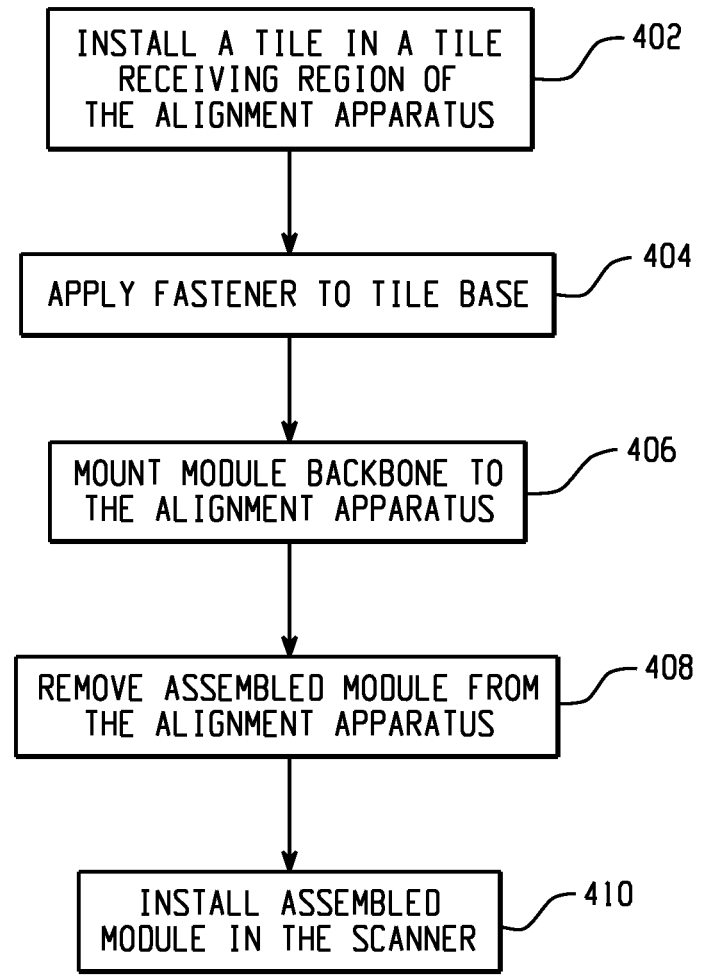
FIG. 4 illustrates an example method.

FIGS. 5-8 graphically illustrate acts of the method of FIG. 4.

Figure 9:
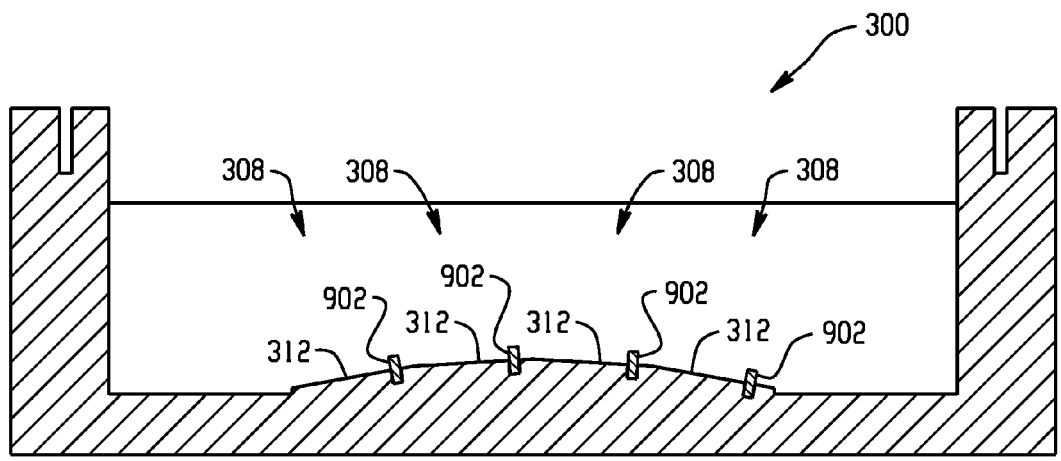

FIG. 9 illustrates another example detector tile alignment apparatus.

Figure 10:
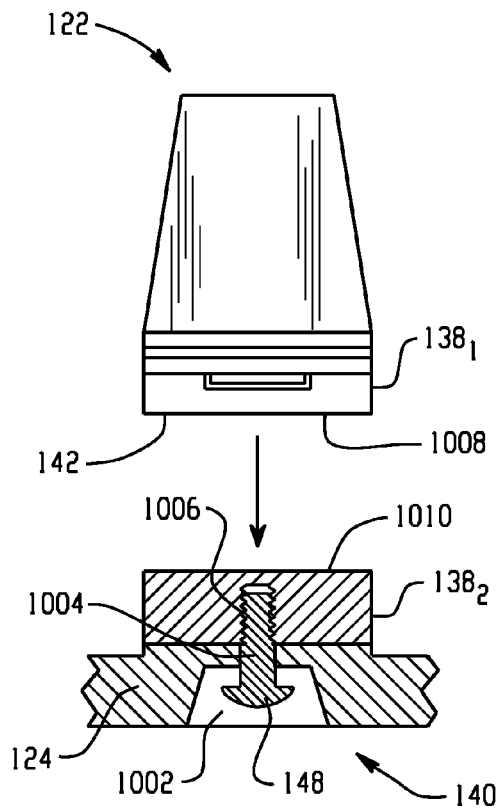

FIG. 10 illustrates an example approach for affixing a detector tile to a detector module backbone.

Figure 11:
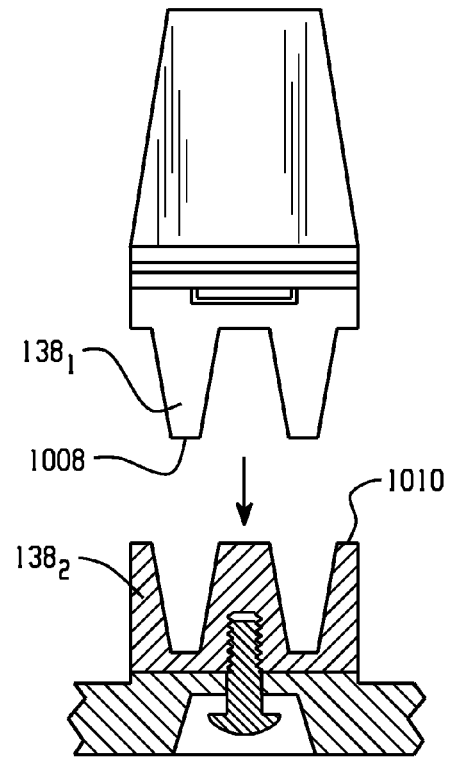

FIG. 11 illustrates another example approach for affixing a detector tile to a detector module backbone.

Figure 12:
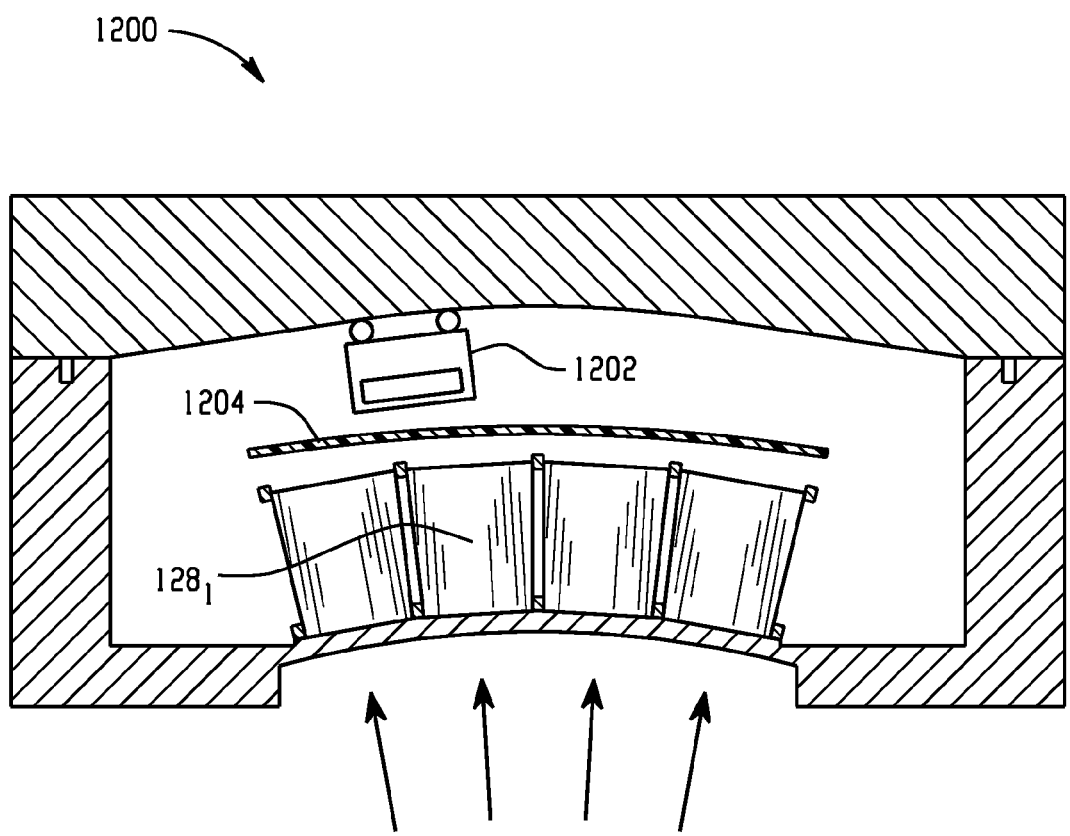

FIG. 12 illustrates an approach for testing the alignment of installed anti-scatter grids and/or tiles in the alignment apparatus.

Figure 1:
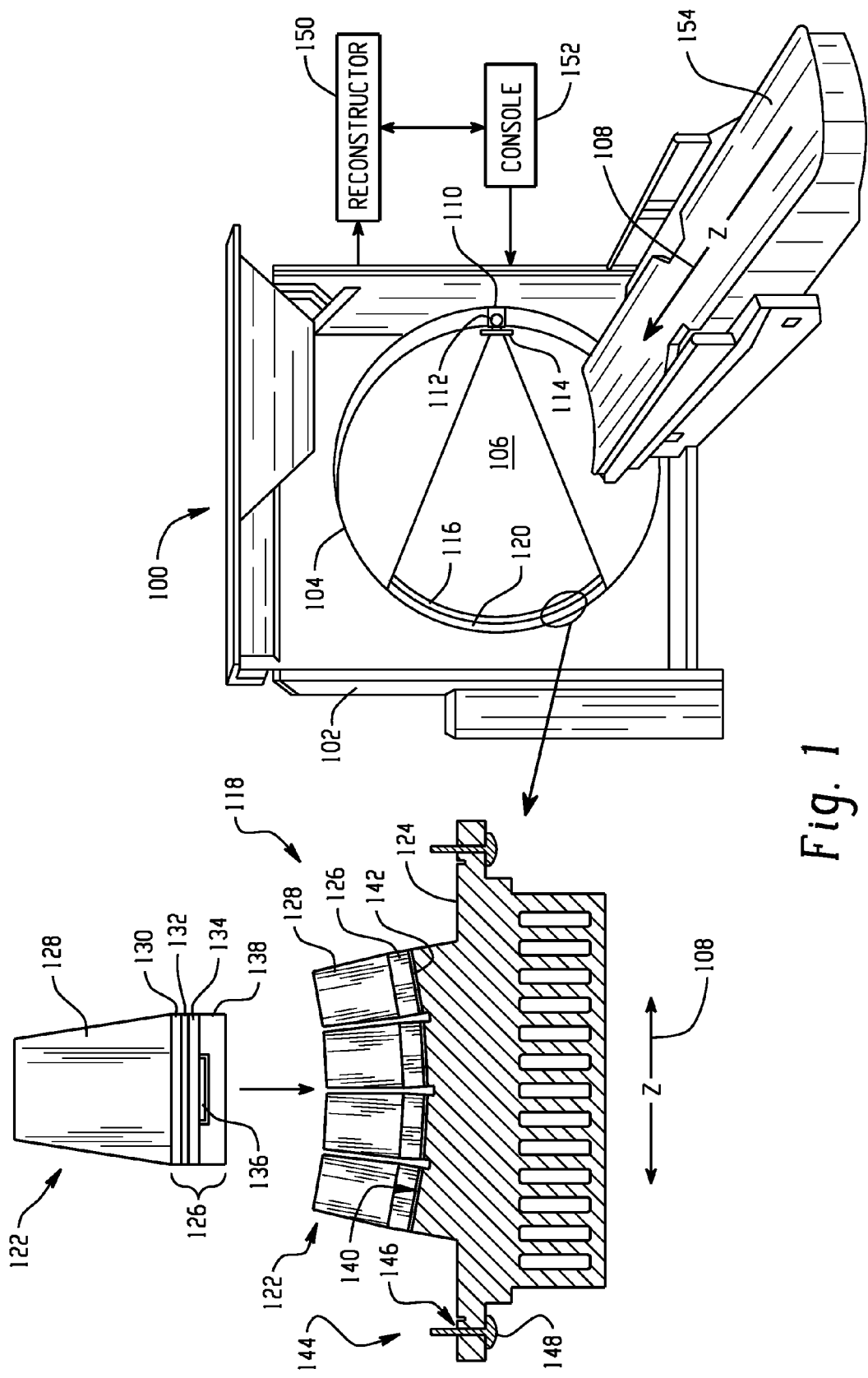
FIG. 1 illustrates an example imaging system.

FIG. 1 illustrates an imaging system 100 such as a computed tomography (CT) scanner. The imaging system 100 includes a stationary gantry 102 and a rotating gantry 104, which is rotatably supported by the stationary gantry 102. The rotating gantry 104 rotates around an examination region 106 about a longitudinal or z-axis 108.

A radiation source 110, such as an x-ray tube, is supported by and rotates with the rotating gantry 104 around the examination region 106. The radiation source 110 emits radiation from a focal spot 112. A collimator 114 collimates the emitted radiation to produce a generally fan, wedge, or cone shaped radiation beam that traverses the examination region 106.

A radiation sensitive detector array 116 detects radiation that traverses the examination region 106 and generates a signal indicative thereof. The radiation sensitive detector array 116 includes a plurality of detector modules 118 aligned in parallel in a transverse (x/y direction) and carried by a module cradle 120. A detector module 118 includes one or more detector mosaics or tiles 122 aligned along a detector module backbone 124 in parallel along the z-axis 108.

Figure 2:
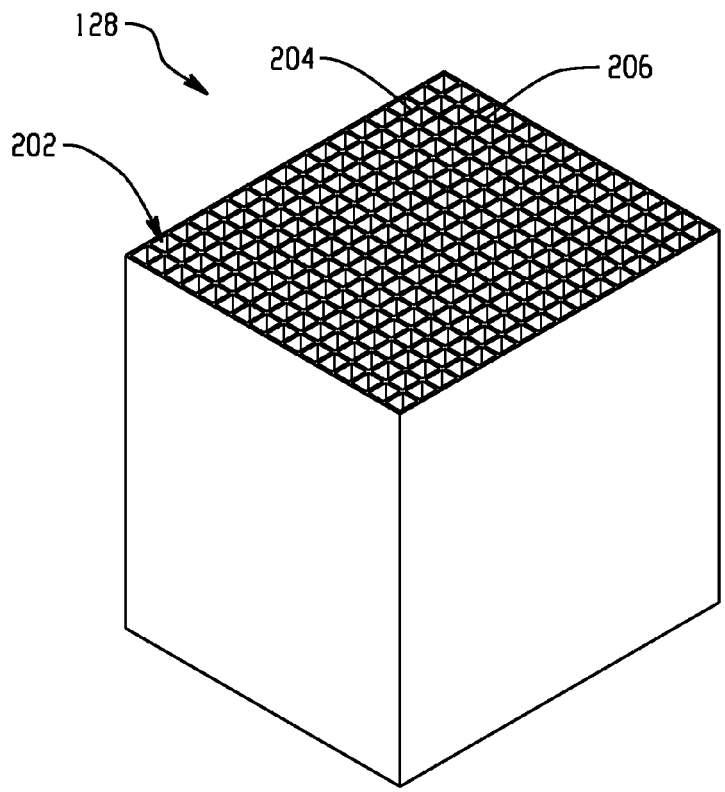
FIG. 2 illustrates an example 2D anti-scatter grid of a tile.

A tile 122 includes a two-dimensional detector 126 and a two-dimensional anti-scatter grid (ASG) 128. The illustrated detector 126 includes a scintillator array 130, a photosensor array 132 (with a two-dimensional arrangement of photo sensing pixels such as photodiodes or other optical sensors), a substrate 134, processing electronics 136, and a base 138. As shown in FIG. 2, the ASG 128 includes a plurality of channels 202 defined by intersecting walls 204 and 206 that extend in the transverse and longitudinal directions. A one-dimensional ASG is also contemplated herein.

Returning to FIG. 1, the scintillator array 130 is optically coupled to the photosensor array 132, and the photosensor array 132 is electrically coupled to the processing electronics 136 on the substrate 134. The processing electronics 136 includes an application specific integrated circuit (ASIC) and/or other integrated circuit. An input/output (I/O) contact(s) (not shown) is in electrical communication with the processing electronics 136. The ASG 128 is affixed to the scintillator array 130 on a side of the incoming radiation.

The ASG 128 allows transmission radiation to pass through and illuminate the scintillator array 130 and attenuates a substantial amount of scatter radiation that would otherwise illuminate the scintillator array 130. The scintillator array 130 detects the radiation traversing the channels of the ASG 128 and generates a light signal indicative thereof. The photosensor array 132 detects the light signal and generates an electrical signal indicative of the detected radiation. The processing electronics 136 process the electrical signal. The processed signal (and/or the unprocessed electrical signal) is conveyed off the tile detector 122 via the I/O contact(s). Note that the I/O contact(s) is also used to convey a signal(s) to the tile detector 122.

The module backbone 124 includes one or more tile receiving regions 140. In the illustrated embodiment, tiles 122 are affixed to the tile receiving regions 140 with a fastener 142 such as an adhesive like a thermally conductive epoxy or the like. Another suitable fastener includes a low melting point metal or alloy. Before affixing the tiles 122 to the module backbone 124, the ASGs 128 are focused (or pre-focused) with respect to the focal spot 112 and aligned with respect to each other. As described in greater detail below, the ASGs 128 are focused and aligned as such and the tiles 122 are affixed to the module backbone 124 using an alignment apparatus.

Tile-populated modules 118 are affixed to the scanner 100. In the illustrated embodiment, the module 118 includes a fastening region 144 with a material free region 146. An example fastener 148 is shown extending through the material free region 146. In one instance, the module 118 is affixed to the cradle 120 using the fastener 148 or other fastener and the material free region 146. By way of example, where the fastener 148 is a screw or the like, the screw engages a threaded recess (with threads complementary to the threads of the screw) in the cradle 120 and removably secures the module 118 to the cradle 120.

As noted above, the radiation sensitive detector array 116 detects radiation and generates a signal indicative thereof. A reconstructor 150 reconstructs the signal and generates volumetric image data indicative thereof. A patient support 154, such as a couch, supports the patient in the examination region 106 for the scan. A general purpose computing system 152 serves as an operator console. Software resident on the console allows the operator to control the operation of the system 100, such as select a scan protocol, initiate and/or terminate a scan, etc.

Figure 3:
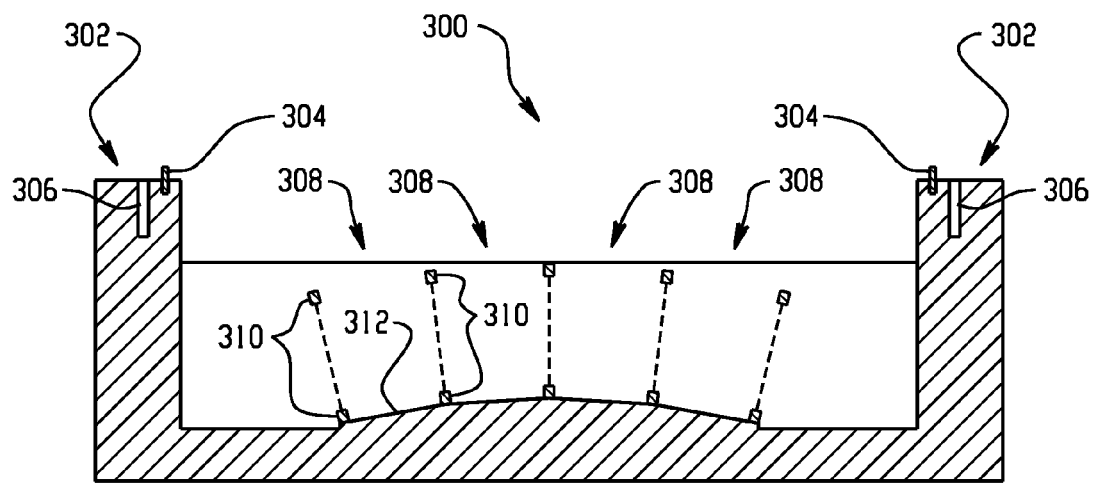
FIG. 3 illustrates an example an alignment apparatus.

FIG. 3 illustrates an example alignment apparatus 300. The apparatus 300 includes one or more module backbone mounting regions 302. The module backbone mounting regions 302 are configured to be physically substantially similar to the module mounting regions of the cradle 120 and are configured for mechanically interfacing the fastening regions 144 (FIG. 1) of the module backbone 124.

The above allows for focusing the ASGs 128 at the focal spot 112 while installing tiles 122 in the apparatus 300 and affixing the tiles 122 to the module backbone 124. The illustrated backbone mounting region 302 include recesses 306, which are adapted to engage the fasteners 148 (FIG. 1). An alignment fiducial 304 facilitates aligning the module backbone 124 with the module backbone mounting region 302. In another embodiment, the alignment fiducial 304 is omitted.

The apparatus 300 further includes one or more guide regions 308. A guide region 308 includes one or more alignment fiducials, including one or more alignment features 310 and an alignment surface 312. The alignment fiducials 310 and 312 support and guide an anti-scatter grid 128 in the apparatus 300. The alignment features 310 are configured to guide an outside surface of the sidewalls of an ASG 128 as the ASG 128 or the corresponding tile 122 is inserted in the apparatus 300.

Note that the dashed lines between the pairs of features 310 are for illustrative purposes and are not part of the alignment features 310. In addition, note that the number of illustrated alignment features 310 is for explanatory purposes and not limiting.

The tile alignment surface 312 is adapted to contact a side of the ASG 128 facing the incoming radiation. The alignment surfaces 312 are configured with respect to the module backbone mounting region 302, and hence the cradle 120, and facilitate orienting the ASGs 128 with respect to the module backbone mounting region 302 to focus the ASGs 128 at the focal spot 112. As a result, installing an ASG 128 into the region 308 pre-focuses the ASG 128 with respect to the focal spot 112.

FIG. 4 illustrates an example method. FIGS. 5-8 graphically illustrate acts of the method.

Figure 5:
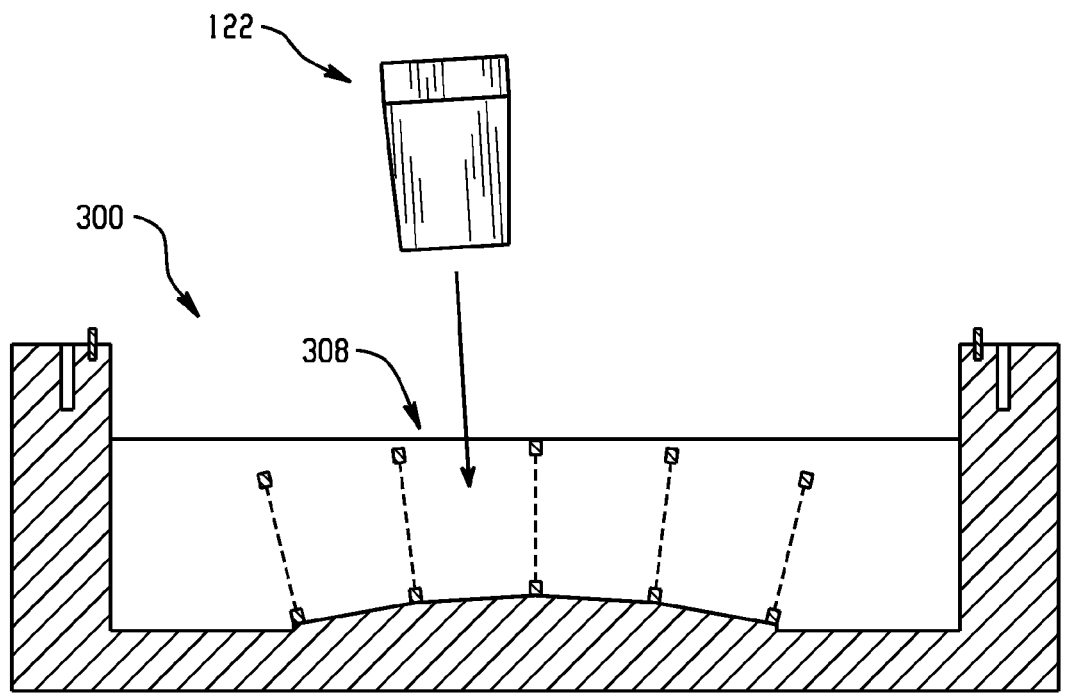

Initially referring to FIGS. 4 and 5, at 402 tiles 122 are installed in the guide regions 308 of the alignment apparatus 300. As noted above, the alignment fiducials 310 and 312 guide the tile 122 in the guide regions 308, aligning the ASGs 128 of the tiles 122 with respect to each other and with respect to the module backbone mounting regions 302, which focuses the ASGs 128 of the tiles 122 at the focal spot 112. The alignment of the ASGs 128 can be tested as described in greater detail below.

Figure 6:
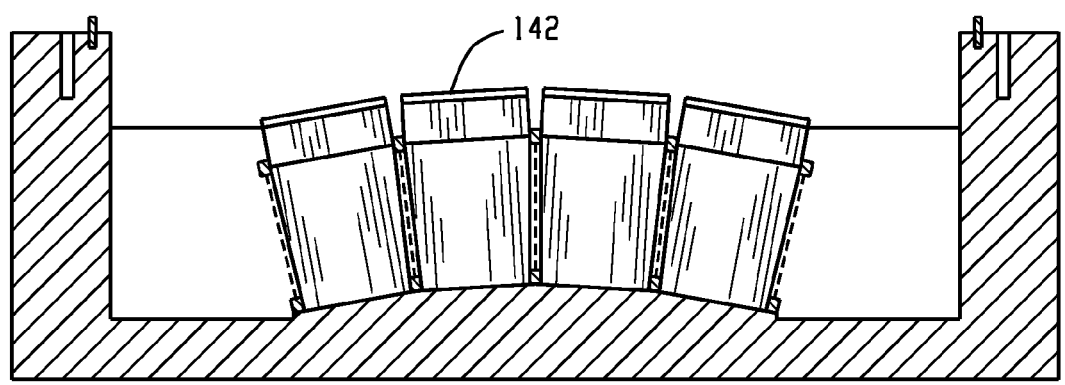

With respect to FIGS. 4 and 6, at 404 the fastener 142 is applied to the bases 138 of the tiles 122. In the illustrated embodiment, the fastener 142 is a screw-less fastener such as a thermally conductive adhesive or other screw-less fastener.

Figure 7:
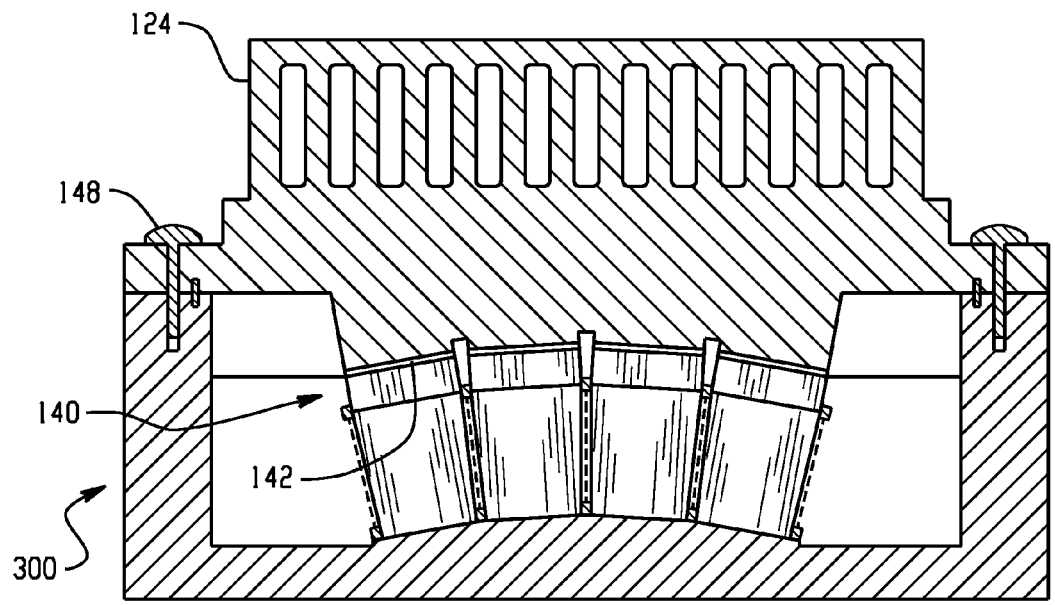

With respect to FIGS. 4 and 7, at 406 the module backbone 124 is mounted to the alignment apparatus 300. In the illustrated embodiment, the backbone 124 is mounted thereto utilizing the fastener 148. Mounting the module backbone 124 as such brings the fastener 142 into physical contact with the tile fastening regions 140 of the backbone 124.

Stacking errors present in the tiles 122 can be compensated for through the fastener 142. By way of example, as the fastener 142 engages a tile fastening regions 144, the fastener 142 is compressed and excess fastener 142 is squeezed out from between the tile 122 and the tile fastening region 144. As such, differences in thickness of the stacked tiles 122 will result in difference thickness of the fastener 142. In addition, the fastener 142 also mitigates mechanical errors due to machining inaccuracies in the module backbone 124 as with configurations in which a screw is used to mount the tiles 122 to the backbone 124. As such, detector shadowing and artifacts such as rings in the CT image can be mitigated.

Figure 8:
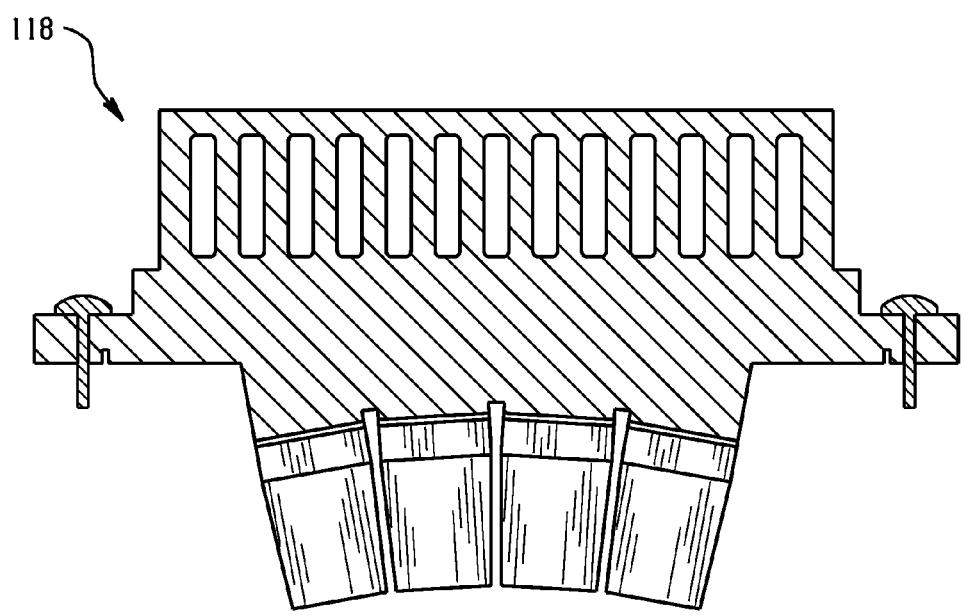

With respect to FIGS. 4 and 8, at 408 the assembled module 118 is removed from the alignment apparatus 300. With respect to FIG. 4, at 410 the assembled module 118 can be installed in the scanner 100.

Variations and/or alternatives are discussed.

In the illustrated embodiment, the detector 126 is a scintillator/photosensor type detector. In another embodiment, the detector 126 includes a direct conversion material such as Cadmium Telluride (CdTe), Cadmium Zinc Telluride (CZT), etc.

FIG. 9 shows another non-limiting embodiment of the alignment apparatus 300. In this embodiment, at least one of the guide regions 308 includes at least one alignment feature 902, and the alignment features 310 are omitted. Unlike the alignment features 310, the at least one alignment features 902 is configured to contact an inner portion of the ASGs 128 such as one or more of the walls 204 or 206 of the ASGs 128. In another embodiment, both of the alignment features 310 and 902 and/or other alignment fiducials are used. In yet another embodiment, other alignment fiducials can be used.

In the embodiments of the module 118 illustrated in connection with FIGS. 1, 3, 7 and 8, the tiles 122 are permanently affixed to the module backbone 124 through the fastener 142. FIGS. 10 and 11 illustrate alternative configurations in which the tiles 122 are removably affixed to the module backbone 124. With respect to FIG. 10, the tile receiving region 140 of the module backbone 124 includes a recess 1002 followed by a material free region 1004. The base 138 of the tile 122 includes first and second sub-portions $138_1$ and $138_2$, having generally planar inner sides 1008 and 1010 that face each other and mate together. The second sub-portion $138_2$ includes a threaded recess 1006 on a side opposite of the inner side 1010.

The second sub-portion $138_2$ is secured to the module backbone 124 utilizing the recess 1002, the material free region 1004, and the threaded recess 1006. By way of example, the fastener 148 can be a screw or the like, and can be used to secure the second sub-portion $138_2$ to the module backbone 124 by extending though the recess 1002 and material free region 1004 and engaging the threaded recess 1006.

With this embodiment, the second sub-portion $138_2$ is affixed to the module backbone 124 via the fastener 148. The first sub-portion $138_1$ is then affixed to the second sub-portion and $138_2$, thereby affixing the tile 122 to the module backbone 124 and forming the module 118. A particular tile 122 can be removed from the module backbone 124 via removing the fastener 148.

FIG. 11 is similar to FIG. 10 except that inner sides 1008 and 1010 are non-planar and have a greater surface area. The larger surface area allows for greater heat transfer and therefore the temperature drop across the adhesive. In the illustrated embodiment, the surface area is increased by making interlocking fins on the upper and lower base sections $138_1$ and $138_2$. Other shapes are also contemplated herein.

With both FIGS. 10 and 11, the upper and lower sections $138_1$ and $138_2$ can be formed from a metal such as aluminum or from another material. Since module accuracy is achieved with the fastener 148, the upper and lower sections $138_1$ and $138_2$ need not be highly accurate. The upper and lower sections $138_1$ and $138_2$ can therefore be made by lower cost methods such as casting, extrusion or the like.

FIG. 12 illustrates an apparatus 1200 for testing the alignment of the ASGs 128 installed in the alignment apparatus 300. In this example, the ASGs 128 are installed in the alignment apparatus 300 as described herein using the alignment fiducials 310, 312 and/or 902. Before affixing the detectors 126 to the ASGs 128, an ASG alignment test fixture 1200 is mounted to the module backbone mounting regions 302.

The alignment test fixture 1200 includes a moveable detector 1202, which can be selectively positioned with respect to a particular installed ASG 128, for example, ASG $128_1$ in the illustrated embodiment. Radiation is projected through the corresponding ASG 128 to the detector 1202. The focal spot 112 can be moved during testing, and ASG shadowing can be evaluated based on the signal output of the detector 1202.

In another embodiment, the apparatus 1200 is used to test tiles 122 (rather than just ASGs 128) installed in the alignment apparatus 300. Likewise, the tiles 122 are installed in the alignment apparatus 300 as described herein using the alignment fiducials 310, 312 and/or 902. Radiation is similarly projected through the corresponding tile 122 to the detector 1202, and ASG shadowing can be evaluated based on the signal output of the detector 1202.

In another embodiment, a film 1204 is additionally or alternatively used in place of the detector 1202.

Being able to pre-test an ASG 128 before mounting it to a detector 126 and/or pre-test a tile 122 before mounting the tile 122 to a module backbone 124 can reduce costs as faulty parts can be detected before the tile 122 and/or the module 118 are fully assembled.

The apparatus 1200 can be formed from a reasonably x-ray transparent material such as aluminum.

The detector array 116 described herein is applicable to various imaging applications, including CT scanners and/or other modality scanners. More particularly, it is well suited for applications in which each tile 122 of the detector array 116 has its own ASG 128 and is separately mounted to the module backbone 124.

The invention has been described herein with reference to the various embodiments. Modifications and alterations may occur to others upon reading the description herein. It is intended that the invention be construed as including all such modifications and alterations insofar as they come within the scope of the appended claims or the equivalents thereof.

What is claimed is:

1. A radiation sensitive detector array, comprising:
a plurality of detector modules extending along a z-axis direction and aligned along an x-axis direction with respect to the imaging system, at least one of the detector modules, including
a module backbone; and
at least one detector tile coupled to the module backbone through a non-threaded fastener, the at least one detector tile including a two-dimensional detector and a two-dimensional anti-scatter grid that is focused at a focal spot of an imaging system
wherein the two-dimensional detector at least includes a base layer, the base layer including: first and second sub-members, wherein the first of the sub-members is coupled to the module backbone through a threaded fastener and the second of the sub-members is part of the tile, the first and the second sub-members respectively include first and second non-planar surfaces that are coupled through a second non-threaded fastener.

2. The detector array of claim 1, wherein the two-dimensional detector comprises:
a scintillator layer coupled to the two-dimensional anti-scatter grid;
a photosensor layer coupled to the scintillator layer; and
a substrate layer with electronics coupled to the photosensor layer; wherein
the base layer is coupled to the substrate layer.

3. The detector array of claim 2, wherein the non-threaded fastener fastens the base layer of the tile to the module backbone.

4. The detector array of claim 1, wherein the non-threaded fastener is a thermally conductive adhesive.

5. The detector array of claim 1, wherein the non-threaded fastener is adaptable to fill a predetermined distance between the tile and the module backbone.

6. The detector array of claim 1, wherein the non-threaded fastener has an adaptable thickness that adapts in accordance with a predetermined alignment of the tile in the module backbone.

7. The detector array of claim 1, wherein the two-dimensional anti-scatter grid is focused with respect to the focal spot with an alignment apparatus.

8. The detector array of claim 1, wherein the first and second non-planar surfaces include complementary interlocking fins.

9. A detector array of an imaging system having a focal spot, comprising:
 a plurality of detector modules aligned along a transverse direction with respect to the imaging system, at least one of the detector modules including a detector tile, wherein the detector tile includes a two-dimensional anti-scatter grid that is focused with respect to a focal spot of the imaging system before installing the at least one detector module in the imaging system, wherein the tile includes a plurality of stacked layers, which include a detector base, including at least two non-planar sub-members coupled together through an adhesive.

10. The detector array of claim 9, the at least one detector module, comprising:
 a module backbone including at least one tile receiving region, wherein the tile is coupled to the at least one tile receiving region through an adhesive fastener.

11. The detector array of claim 9, wherein the fastener compensates for stacking misalignment of the stacked layers.

12. The detector array of claim 11, wherein the detector base is affixed to the module backbone through the adhesive fastener.

13. The detector array of claim 12, wherein the detector base is a single member.

14. The detector array of claim 12, wherein one of the members is affixed to the module backbone through a threaded fastener and another of the at least two sub-members is part of the tile.

15. The detector array of claim 9, wherein the two-dimensional anti-scatter grid is focused with respect to the focal spot with an alignment apparatus.

16. The detector array of claim 9, wherein the at least two non-planar sub-members include complementary interlocking fins that are coupled together.

17. A method for focusing an anti-scatter grid of a detector tile with a focal spot of an imaging system prior to installing the detector tile in the imaging system, comprising:
 inserting at least one two-dimensional anti-scatter grid in a guide region of an alignment apparatus, the guide region, including one or more fiducials that guide the at least one two-dimensional anti-scatter grid in the guide region, wherein the guide region is pre-aligned with the focal spot, and guiding the at least one two-dimensional anti-scatter grid into the guide region focuses the at least one two-dimensional anti-scatter grid with the focal spot, wherein the anti-scatter grid is part of a detector tile that is inserted in the receiving region, the detector tile includes a base region with first and second non-planar sub-regions, the first non-planar sub-region is affixed to the tile; and
 coupling the first and second non-planar sub-regions together after the second non-planar sub-region is coupled to a module backbone installed in the imaging system.

18. The method of claim 17, wherein the first and second non-planar sub-regions include complementary interlocking fins.

19. The method of claim 17, further including affixing the module backbone after the second non-planar sub-region of the base region of the tile through a thermally conductive epoxy.

* * * * *